United States Patent [19]

Glass

[11] 4,166,658
[45] Sep. 4, 1979

[54] SPHERICAL BEARING ASSEMBLY WITH SNAP-IN SWIVEL CONTACT CAPABILITY

[75] Inventor: Kenneth H. B. Glass, Cambridge, Canada

[73] Assignee: Electrohome Limited, Kitchener, Canada

[21] Appl. No.: 887,663

[22] Filed: Mar. 17, 1978

[51] Int. Cl.² .............................................. F16C 23/00
[52] U.S. Cl. ....................................... 308/15; 308/29; 308/72
[58] Field of Search ....................... 308/72, 74, 15, 26, 308/29, DIG. 9, DIG. 5, 78, 22, 240, 140, 92, 106, 121

[56] References Cited
U.S. PATENT DOCUMENTS

| 3,649,092 | 3/1972 | Coleman | 308/72 |
| 3,866,986 | 2/1975 | Holper | 308/29 X |

Primary Examiner—Douglas C. Butler
Attorney, Agent, or Firm—Sim & McBurney

[57] ABSTRACT

There is provided a self-aligning bearing assembly for a motor. The bearing assembly includes a housing member for securing to the motor, the housing member defining a bearing seat within a recess cavity larger than the bearing seat. A spherical bearing is seated in the seat, and a porous oil-retaining pad surrounds the bearing. A spring element with a central opening is in contact with the spherical bearing remote from the seat, and a closure member for the recess in the housing member is provided to enclose the pad, the spherical bearing, and the spring. The closure member and the housing member have a snap-fit together, the snap-fit being provided by outwardly projecting elongate ribs on one of the members, and elongate recesses on the other. The recesses are wider than the ribs, so that a certain degree of play between them is possible.

5 Claims, 4 Drawing Figures

U.S. Patent  Sep. 4, 1979  4,166,658
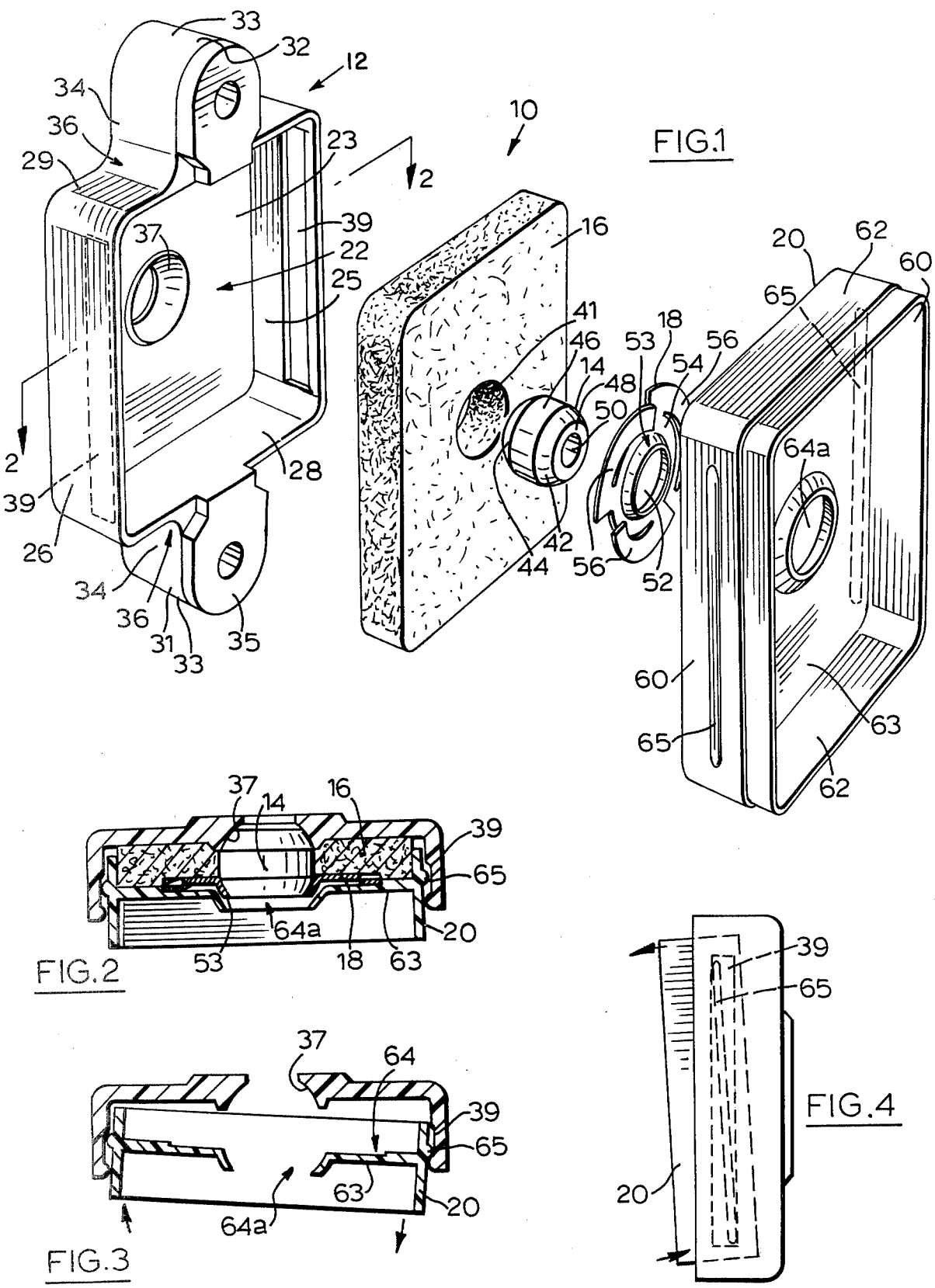

SPHERICAL BEARING ASSEMBLY WITH SNAP-IN SWIVEL CONTACT CAPABILITY

This invention relates generally to bearing assemblies used in items such as small electric motors, and has to do particularly with a snap-together enclosure for a self-aligning bearing assembly which provides for limited swivelling freedom and a spring loaded contact with the laminated core of an electric motor.

It is an aspect of this invention to provide a self-aligning bearing assembly in which the various parts are capable of being snapped together by hand prior to assembly against the laminated core of an electric motor, the snap-construction being such as to allow the portion adjacent the laminated core to have a small degree of swivelling freedom in conjunction with a spring-loaded urging of the adjacent portion against the laminated core, so that dust and dirt etc. may be kept away from the rotor.

Accordingly, this invention provides a self-aligning bearing assembly for a motor, comprising:

a housing member adapted to be secured to the motor and defining a bearing seat within a recess cavity which is larger than the bearing seat, the recess cavity being defined in part by two opposed side wall portions, a spherical bearing seated in said seat, porous oil-retaining means surrounding said bearing and within said recess cavity, a spring element having a central opening in contact with the spherical bearing, and a closure member for the recess cavity, the closure member including side partitions adapted to be overlapped by said side wall portions of the housing member, and a main wall briding between the side partitions, the spring element having means bearing outwardly against the main wall, the latter having an opening corresponding to the central opening of the spring element, each side wall portion and its corresponding side partition having a snap-fit construction in which one of them defines an elongate rib projecting toward the other, while the other defines an elongate recess for receiving the rib, the rib and the recess each having its own respective width, the width of the elongate recess being greater than the width of the rib, thereby to permit the closure member to swivel with respect to the housing member in planes parallel and perpendicular to the direction of the rib.

One embodiment of this invention is illustrated in the accompanying drawings, in which like numerals denote like parts throughout the several views, and in which:

FIG. 1 is an exploded perspective view of the components of the assembly according to this invention;

FIG. 2 is a sectional view through the assembly of FIG. 1, when in assembled condition, taken along the line 2-2 in FIG. 1; and FIGS. 3 and 4 are views illustrating the swivelling freedom of one part of the assembly with respect to the other in two mutually perpendicular directions.

Attention is first directed to FIG. 1, in which a self-aligning bearing assembly 10 is seen to include a housing member 12, a spherical bearing 14, a porous, oil-retaining pad 16 of felt or the like, a spring element 18, and a closure member 20.

The housing member 12 is shaped to define a recess cavity 22 of generally square configuration. The recess cavity 22 is bounded by a bottom wall 23, two side wall portions 25 and 26, and two end wall portions 28 and 29.

The housing member 12 is adapted to be secured in place against an electric motor, and more specifically to be secured to the laminated iron core of an electric motor. To this end, the housing member 12 is provided with outwardly projecting integral bosses 31 and 32 located centrally of the end wall portions 28 and 29 respectively, each boss being defined by a part cylindrical outer portion 33 merging with flat regions 34 and then merging through a small radius at 36 with the end wall portions 28 and 29. On the far side of the bosses 31 and 32 (the portion not seen in FIG. 1), each boss may be provided with a hexagonal or part-hexagonal indentation or recess for receiving a hexagonal nut or the head of a bolt. It will be understood that small electric motors will require two of these self-aligning bearing assemblies, one on either side of the laminated iron core, and that a bolt/nut combination would be used passing all the way through the core in holes provided for the purpose, and tying the two bearing assemblies tightly together against the iron core.

On the nearer or inner end of each boss 31 and 32 is provided an inwardly projecting integral spacer portion 35, the purpose of which will be explained shortly.

Located centrally of the bottom wall 23 is a spherical bearing seat 37 which is provided integrally with the bottom wall 23.

Each of the side wall portions 25 and 26 which contribute to defining the recess cavity 22 has an elongate recess 39 extending substantially the whole of the length of the side wall portions 25 and 26. The purpose of the elongate recesses 39 will be explained presently.

Turning now to the pad 16, this may be of any conventional construction, for example of felt as previously mentioned, so long as it is capable of being impregnated with and holding lubricating oil. It will be noted that the pad 16 is configured complementarily with the recess 22, so that it substantially fills the same. The pad 16 has a cylindrical centre hole 41 which receives the spherical bearing 14.

The bearing 14 need not be a complete sphere, for reasons well known in the trade. The bearing 14 includes spherical surfaces 42 and 44, a cylindrical surface 46, flat annular end surfaces 48, and a central axial bore 50 for receiving the rotor shaft. The spherical surface 44 is adapted to be received in the bearing seat 37.

The spring element 18 has a central opening 52 which is in contact with the spherical bearing 14 at the surface 42. As can be seen, the spring element 18 defines a flared portion 53 immediately around the opening 52, which facilitates seating against the spherical surface 42 of the spherical bearing 14. Immediately surrounding the flared portion 53 is a flat annular region 54 from which extend, at 120° intervals, finger portions 56, each of which extends outwardly from its location of attachment with the annular region 54 and then circumferentially around the outer periphery of the annular region 54.

As can be seen in FIG. 1, the finger portions 56 are distorted away from a coplanar condition with respect to the annular region 54, and extend to the right as seen in the Figure, i.e. in the direction of the closure member 20 which is now to be described.

The closure member 20 has side partitions 60, end partitions 62, and a main wall 63 bridging between the partitions 60 and 62. As can be seen in FIGS. 2 and 3, the main wall bridges between the side and end partitions at an intermediate location, so that the partitions extend to both sides of the main wall 63. Further, the main wall 63 is stepped at 64 to receive the fingers 56 of the spring element.

The main wall 63 defines a central opening 64a which corresponds with the opening 52 in the spring element 18. As seen in FIGS. 1 and 2, the opening 64a is flared away from the pad 16. The flared portion 53 of the spring element 18 is not intended to seat in the flare around the opening 64a, but would normally be spaced therefrom as seen in FIG. 2. The spring element remains centered with respect to the bearing assembly by virtue of the seating of the fingers 56 in the step 64.

Extending longitudinally of the side partitions 60 of the closure member 20 are two elongate ribs 65. As can be seen in the figures, the width of each rib 65 is clearly less than the width of the elongate recesses 39 in the housing member 12. The reason for this disparity in width, and the manner in which the different portions are assembled together, will be explained with reference to FIG. 2, to which attention is now directed. In FIG. 2, the spherical bearing is shown seated in the spherical seat 37, and in the flared portion 53 of the spring element 18. The fingers 56 of the spring element 18 are in turn received within the step 64 of the main wall 63 of the closure member 20. The pad 16 is enclosed between the housing member 12 and the closure member 20. When the parts are assembled together in the manner shown in FIG. 2, the elongate ribs 65 are received within the elongate recesses 39. It can now be visualized that this interlock between the elongate ribs 65 and the elongate recesses 39 constitutes a "loose fit," which allows the two main components 12 and 20 to swivel with respect to each other over a limited range. FIG. 3 shows in outline form the swivelling of closure member 20 with respect to the housing member 12 in a plane which is perpendicular to the direction of the elongate ribs 65, while FIG. 4 illustrates the swivelling of these two components in a plane which is at right angles to the plane discussed with respect to FIG. 3. In FIG. 3, the right-hand elongate rib 65 is seen at the lower or inner edge of its respective elongate recess 39, while the left-hand elongate rib 65 is seen at the upper or outer edge of its respective elongate recess 39.

In FIG. 4, the illustrated elongate rib 65 is seen to be angulated with respect to its respective elongate recess 39.

It will now be understood that the spacer portions 35 have been provided on the bosses 33 for the purpose of keeping the edge of the housing member 12 spaced away from the laminated iron core of the electric motor. At the same time, it can be seen that the closure member 20 is intended to project over the intervening gap and to contact the iron core of the electric motor in a sealing configuration which is adapted to keep dust and dirt out of the space occupied by the rotor. It is for this reason that the side partitions 60 and the end partitions 62 of the closure member 20 extend well to the inside of the main wall 63.

It can now be understood that the spring element 18 will attempt to urge the closure member 20 inwardly toward the laminated iron core of the electric motor, and that the closure member 20 will achieve an excellent sealing contact with the laminated iron core of the electric motor due to the limited swivelling which is possible, regardless of how aligned the housing member 12 may be with respect to the plane of the laminations of the iron core.

One of the most important areas where the elongate rib and elongate recess combination provides an advantage is in the assembly of the bearing housing, and its attachment to the electric motor. Much of this work is carried on by hand, with the pieces being fitted into each other, prior to assembly to the laminated iron core. In the process of assembly, then, the worker will place the various components together in the manner shown in FIG. 2 prior to clamping two such assemblies against a laminated iron core with a rotor shaft extending through the two spherical bearings 14. The worker is able to snap the various components together into the configuration of FIG. 2, with the rib/recess engagement being sufficient to hold the components in assembled condition during the attachment together with the laminated iron core and the rotor shaft. In the absence of the rib and recess arrangement, it would be considerably more difficult to maintain the various portions in proper alignment while the bearing housings were being attached to the laminated iron core. One area of particular difficulty is the retention of the spring element 18 in proper registry both with the spherical bearing 14 and with the step 64 of the main wall 63. The provision of the elongate ribs 65 and the elongate recesses 39 overcomes this difficulty.

It will be understood that the ribs and the recesses could be provided on the opposite members. In other words, the ribs could be provided on the side wall portions 26 of the housing member 12, and the recesses could be provided in the side partitions 60 of the closure member 20.

It will further be understood that, while the recess cavity 22 has been described and shown as a square one, it would be very simple to provide a rectangular cavity or any other geometric shape, which allowed the loose rib/recess interconnection which has been described earlier.

In a preferred form of this invention, the width of each elongate recess is at least twice as great as the width of the corresponding elongate rib, but it will be understood that the comparative proportions of these components is dependent strictly upon the degree of swivelling freedom that is desired or required for the assembly in order to assure proper sealing contact between the closure member 20 and the laminated iron core of an electric motor.

What I claim is:

1. A self-aligning bearing assembly for a motor, comprising:
 a housing member defining a bearing seat within a recess cavity which is larger than the bearing seat, the recess cavity being defined in part by two opposed side wall portions,
 a spherical bearing seated in said seat,
 porous oil-retaining means surrounding said bearing and within said recess cavity,
 a spring element having a central opening in contact with the spherical bearing,
 and a closure member for the recess cavity, the closure member including side partitions adapted to be overlapped by said side wall portions of the housing member, and a main wall bridging between the side partitions, the spring element having means bearing outwardly against the main wall, the latter having an opening corresponding to the central opening of the spring element,
 each side wall portion and its corresponding side partition having a snap-fit construction in which one of them defines an elongate rib projecting toward the other, while the other defines an elongate recess for receiving the rib, the rib and the recess each having its own respective width, the width of the elongate recess being greater than the width of the rib, thereby to permit the closure member to swivel with respect to the housing member in planes parallel and perpendicular to the direction of the rib.

2. The invention claimed in claim 1, in which the two opposed side wall portions are straight and parallel, and in which the width of each elongate recess is at least twice as great as the width of an elongate rib.

3. The invention claimed in claim 1, in which the recess cavity and the closure member are both substantially rectangular in configuration, with the opposed side wall portions being straight and parallel; in which the central opening in the spring element is flared away from the spherical bearing to provide a seat for the bearing, and in which the opening in the main wall of the closure member is shaped complementary to the flared opening of the spring element, thereby to receive the flare and to center the spring element.

4. The invention claimed in claim 3, in which the ribs are on the closure member and the elongate recesses are on the housing member.

5. The invention claimed in claim 1, in which the ribs are on the closure member and the elongate recesses are on the housing member.

* * * * *